United States Patent [19]

Stein

[11] Patent Number: 5,628,055
[45] Date of Patent: May 6, 1997

[54] MODULAR RADIO COMMUNICATIONS SYSTEM

[75] Inventor: Per Stein, Stockholm, Sweden

[73] Assignee: Telefonaktiebolaget L M Ericsson publ, Stockholm, Sweden

[21] Appl. No.: 353,966

[22] Filed: Dec. 12, 1994

Related U.S. Application Data

[63] Continuation of Ser. No. 26,478, Mar. 4, 1993, abandoned.

[51] Int. Cl.⁶ ..................................... H04B 1/38
[52] U.S. Cl. ................ 455/89; 455/90; 455/127; 379/58; 364/705.05; 375/222
[58] Field of Search ................ 455/89, 90, 128, 455/129, 127, 84, 269, 348, 350, 351; 375/222; 343/702; 345/825.44; 379/58, 59; 364/705.01, 705.05; 235/492

[56] References Cited

U.S. PATENT DOCUMENTS

| | | |
|---|---|---|
| 4,881,258 | 11/1989 | Kaiwa et al. ................ 379/58 |
| 4,939,770 | 7/1990 | Makino ................ 455/127 |
| 4,972,457 | 11/1990 | O'Sullivan ................ 379/59 |
| 5,018,051 | 5/1991 | Yamada et al. . |
| 5,020,090 | 5/1991 | Morris . |
| 5,028,806 | 7/1991 | Stewart et al. . |
| 5,043,721 | 8/1991 | May ................ 340/825.44 |
| 5,109,540 | 4/1992 | Dzung et al. ................ 455/90 |
| 5,157,247 | 10/1992 | Takahira . |
| 5,183,404 | 2/1993 | Aldous et al. . |
| 5,185,700 | 2/1993 | Bezos et al. . |
| 5,202,838 | 4/1993 | Inoue . |
| 5,203,021 | 4/1993 | Repplinger et al. ................ 455/90 |
| 5,251,232 | 10/1993 | Nonami ................ 455/84 |
| 5,260,989 | 11/1993 | Jenness et al. ................ 379/59 |
| 5,361,061 | 11/1994 | Mays et al. ................ 455/269 |
| 5,373,149 | 12/1994 | Rasmussen ................ 235/492 |
| 5,373,300 | 12/1994 | Jenness et al. ................ 455/89 |

FOREIGN PATENT DOCUMENTS

| | | |
|---|---|---|
| 0571125 | 11/1993 | European Pat. Off. . |
| 4136548 | 9/1992 | Germany . |
| 9003076 | 3/1990 | WIPO . |

OTHER PUBLICATIONS

Patton, Carole "Radio Transceiver Circuit Card Acts as Wireless Modem in PCS" Mar. 28, 1988.

Primary Examiner—Reinhard J. Eisenzopf
Assistant Examiner—Thanh Le
Attorney, Agent, or Firm—Jenkens & Gilchrist, A Professional Corporation

[57] ABSTRACT

A modular telecommunications system configured for wireless telecommunication in accordance with a pre-selected standard. Modular units are adapted to be secured within other items of electronic equipment for establishing a telecommunications link with a wireless network. The modular telecommunications unit comprises a housing for mounting a radio transceiver therein. The housing includes a plurality of contacts arranged along a first end, the contacts being adapted for engagement with contacts in the electronic equipment, and at least one radio connector disposed along the second, opposite end of the housing and connected to the radio transceiver within the housing whereby the radio transceiver can be coupled to an antenna to enable communication therefrom.

5 Claims, 7 Drawing Sheets

MODULAR RADIO COMMUNICATIONS SYSTEM

This a continuation of application Ser. No. 08/026,478, filed on Mar. 4, 1993, which was abandoned upon the filing hereof.

BACKGROUND OF THE INVENTION

1. Field of the Invention

The present invention relates to modular telecommunication equipment and, more particularly, to a card mounted radio transceiver and/or modem for use in establishing a link to a wireless network for electronic equipment such as personal computers.

2. History of the Prior Art

The fields of both data processing and telecommunications have experienced marked advances in recent years. Personal computers have become smaller and more efficient in their progression through desktop, laptop, notebook, and palmtop versions. The great advances in microprocessors, memory chips and miniaturization techniques have also enabled more and more computing power to be packaged in smaller and smaller spaces.

Personal computers are manufactured by many different suppliers around the world. An entire industry has subsequently developed in supplying memory cards for enhancing the capacity of this wide variety of personal computers. Recently, there has been a movement toward standardizing the interconnection formats for use in circuit cards for personal computers. In particular, the PC and Memory Card International Association (PCMCIA) was formed with the goal of promoting the interchangeability of integrated circuit and memory cards among computers and other types of electronic products. Toward this end, the PCMCIA has promulgated certain physical and electrical standards to ensure that cards will be able to be used in different pieces of equipment. Both data storage, i.e. memory, and peripheral expansion, i.e. I/O, card types constructed in accordance with standards should be able to be used in any connectors also constructed in accordance with the standards. Such a standard is set forth in a variety of documents including the PCMCIA PC Card Standard, Release 2.0, incorporated by reference herein. The standard sets forth a 68 pin interchange for I/O type circuit cards for use in PCs.

Advances in wireless telecommunications have also moved rapidly in recent years. Various communication standards have been promulgated around the world defining specific frequencies, data rates, data formats, and the like for both voice and data communications by radio links between base stations and mobile units. For example, specialized packet switching systems for mobile data communications have enabled portable computers to directly uplink data access into the landline data communication network. Similarly, conventional voice based cellular radio systems, both analog and digital versions, can receive data from portable computers and transmit that data through the conventional telephone network to a remotely located data terminal. In addition, other systems such as paging (both local and global), DECT (Digital European Cordless Telecommunications), Mobitex, CDPD (Cellular Digital Packet Data), PCS (Personal Communications System) and the like have come into recent use. Each of these wireless telecommunications formats and standards generally requires separate software to provide a gateway for data into the wireless network as well as separate transmission/reception formats. This allows communication with radio base stations operating in different geographic areas as well as parts of different networks. It would be desirable, however, to package radio transceivers and/or modems in a modular manner so that a telecommunications terminal, such as a portable telephone or a portable personal computer, could be adapted for communication with different systems by simply replacing the modular unit with one which was especially configured for the telecommunications network with which communication was desired.

The use of card mounted telecommunications interface equipment in a PC has existed for some time. In particular, modems are frequently mounted on an I/O card and plugged into receiving receptacles within the PC. The modem then enables the interface of a PC with standard telecommunication network lines and the transmission/reception of data for those lines. This is an extremely useful tool and maximizes the usefulness of the PC.

More recently, the company GEC PLESSEY developed a radio transmitter for a wireless local area network (WLAN) for a standard card engagement with a PC so that data can be transmitted within approximately a hundred meters with a frequency band reserved for such activity. However, this radio transmitter for a wireless LAN does not incorporate the requisite flexibility and communications alternatives inherent in Applicant's present system which overcomes many of the disadvantages of the prior art.

It would be an advantage therefor to provide a standard PCMCIA card mounted radio transceiver which is readily replaceable in order to enable electronic equipment to communicate with various networks and in accordance with various radio standards merely by interchanging such a card. The system of the present invention and various components thereof provide such advantages.

SUMMARY OF THE INVENTION

The present invention relates to modular radio communications equipment. More particularly, one aspect of the present invention includes providing card mounted radio telephone and/or modem equipment configured for wireless telecommunication (which includes voice and/or data) in accordance with a preselected standard and/or format. Such modular units may be replaceably secured within other items of electronic equipment for establishing therefrom a telecommunications link with a wireless network. In one embodiment, such equipment includes portable cellular radio subscriber terminals.

In another aspect, the invention includes a modular housing for mounting a radio transceiver adapted for telecommunications in accordance with a preselected standard. An array of contacts are arranged along a first end of the housing and adapted for engagement with a mating array of contacts in an item of electronic equipment, such as a computer or portable communications device. A separate antenna connector is disposed along either the first or second end of the housing. The connector is coupled to the radio transceiver within the housing, and adapted for being coupled to a separate antenna structure to enable communication from the radio transceiver. As used herein, the term radio transceiver may also include a modem whereby both voice and data may be transmitted and received by the antenna. The antenna may be contained within the item of electronic equipment, such as in the computer chassis, or it may be provided as an external attachment to the housing.

In yet another aspect, the above described invention includes a connector for coupling the radio transceiver (which may include a modem) contained within the housing to a power source for the supply of current thereto. The power connector may include enlarged ones of the contacts of the contact array disposed on the first end of the housing adapted for plugging into a power source provided within the electronic equipment. In an alternative embodiment, the power connector may be disposed along the second opposite end of the housing for connection to a power source external of the item of electronic equipment. As herein described, the item of electronic equipment for the modular telecommunications unit may comprise a personal computer, a cellular telephone, a digital notebook and the like.

In a further aspect, the present invention includes a method of providing modular telecommunications for an item of electronic equipment, comprising the steps of providing a modular housing and mounting a radio transceiver adapted for telecommunications in accordance with a preselected standard in the housing. An array of contacts is disposed along a first end of the housing. The contact array is adapted for mating engagement with a contact array located in the electronic equipment. One or more connectors may then be disposed along either the first or a second end of the housing for select interconnect functions. In one embodiment a connector may couple the radio transceiver within the housing to an antenna located in the electronic equipment or mounted externally thereof. In another embodiment, a connector may couple a power source located in the electronic equipment or externally thereof. The housing is then inserted into the electronic equipment and the contact array of the housing is plugged into the mating contact array of the electronic equipment to establish electrical communications therebetween. In this manner, a method of modular telecommunications for the particular electronic equipment is provided in a configuration greatly facilitating the use and efficiency thereof.

BRIEF DESCRIPTION OF THE DRAWINGS

For a more complete understanding of the present invention and for further objects and advantages thereof, reference may now be had to the following description taken in conjunction with accompanying drawings, in which.

DETAILED DESCRIPTION

Figure 1:
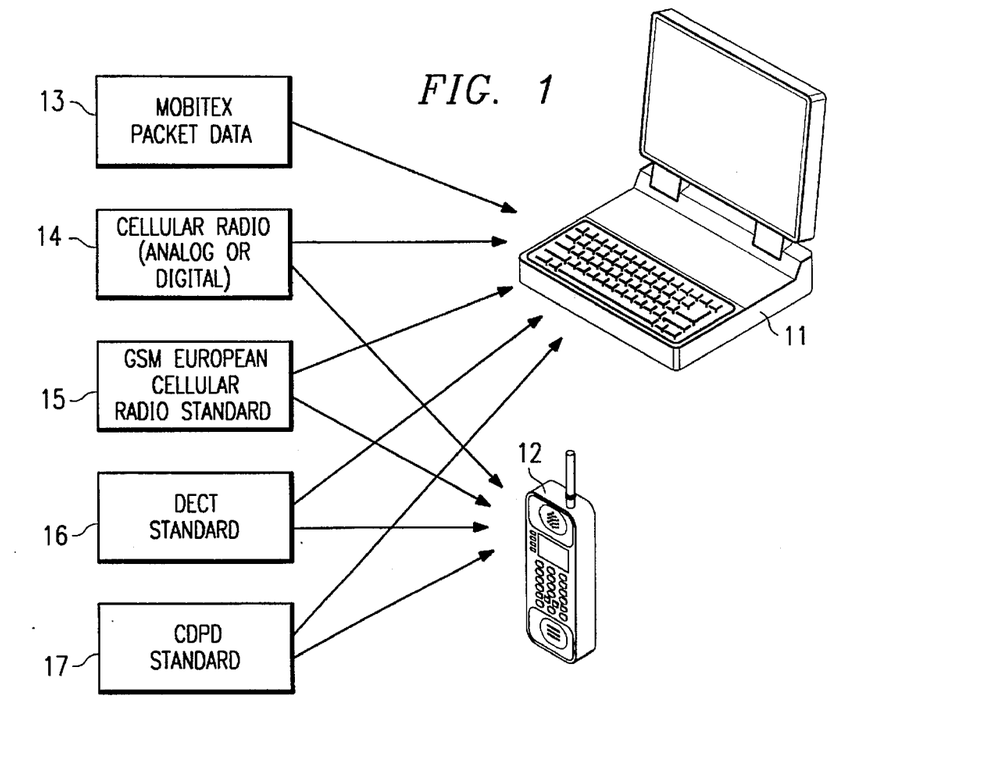
FIG. 1 is a block diagram illustrating an overall concept employed in one aspect of the present invention.

Referring first to FIG. 1, there are shown portable communications devices in the form of data processing units, such as a laptop or notebook computer 11 and a portable telephone instrument 12. It is well established to allow the PC 11 and telephone 12 to communicate with various wireless telecommunication networks. Each of the telecommunication networks may, however, include different telecommunication standards and/or require modems of different types as represented diagrammatically in blocks 13–17. The various telecommunication standards may include, for example, AMPS, D-AMPS, JDC, TACS, GSM, NMT-450, NMT-900, DECT, Mobitex and future Spread Spectrum standards, as well as many more.

Still referring to FIG. 1, the portable telephone instrument 12 may include basic components for telecommunications with various wireless networks operating in accordance with numerous telecommunications standards. For example, should the telephone instrument 12 be needed for use in the United States, it must be capable of transmitting/receiving on a defined frequency band and in accordance with either the analog or digital modulation techniques in use in the United States. However, should the telephone instrument 12 be needed for communication with the wireless system which exists in the U.K. or Continental Europe, it would have to be capable of communicating on different frequencies and in accordance with somewhat different modulation techniques in order to be useful.

Referring still to FIG. 1, the laptop computer 11 may be needed for data communication with a number of different data networks which exist in a number of parts of the world. For example, a package switched data network exists in the Scandinavian and several European countries and in the United States and Canada which functions utilizing data packets of a prescribed size. The package switched data network is constructed in accordance with a prescribed protocol and provided as part of a service referred to by the trademark "MOBITEX" with which the assignee of the present invention is associated. Similarly, the laptop computer 11 may also be needed for communication with the United States cellular radio network (either in analog or digital format), with the European GSM digital cellular radio network, or the CDPD (Cellular Digital Package Data) network from time to time. Thus, the broad concept of the system of the present invention includes providing radio transceivers and/or modems 13–17 which are adapted for use in communication with the various networks in accordance with various standards used therein. Additionally, the term "transceiver" as used herein comprises appropriate radio control logic of the type necessary to make up a radio device that is capable of communicating with a wireless communication standard such as D-amps, GSM, etc. For example, the transceiver may include a transmitter and receiver, and when the communications device is used for data transmission, the transceiver may also incorporate data modem circuitry.

Still referring to FIG. 1, the modem 13 provides for radio communication with the MOBITEX packet data switched network, while modem 14 represents a modular unit which could be constructed to communicate with the conventional cellular radio network in the United States, either in analog or digital format. Similarly, the modem 15 might be adapted for radio communication with the European digital cellular radio network in accordance with the GSM standards adopted by the European Telecommunications Standards Institute (ETSI). Modem 16 could, likewise, permit telecommunications in accordance with the Digital European Cordless Telecommunications (DECT) standard. Any of modems 14–16 might be useful within either the laptop computer 11 or the telephone subscriber instrument 12 while those units, as well as the MOBITEX data packet modem 13, could be used within the laptop computer 11. Moreover, the use of standard modems packaged in a modular form in standard sizes, would have great advantages in the future in providing flexibility within both voice and data telecommunication systems used throughout the world.

Figure 2:
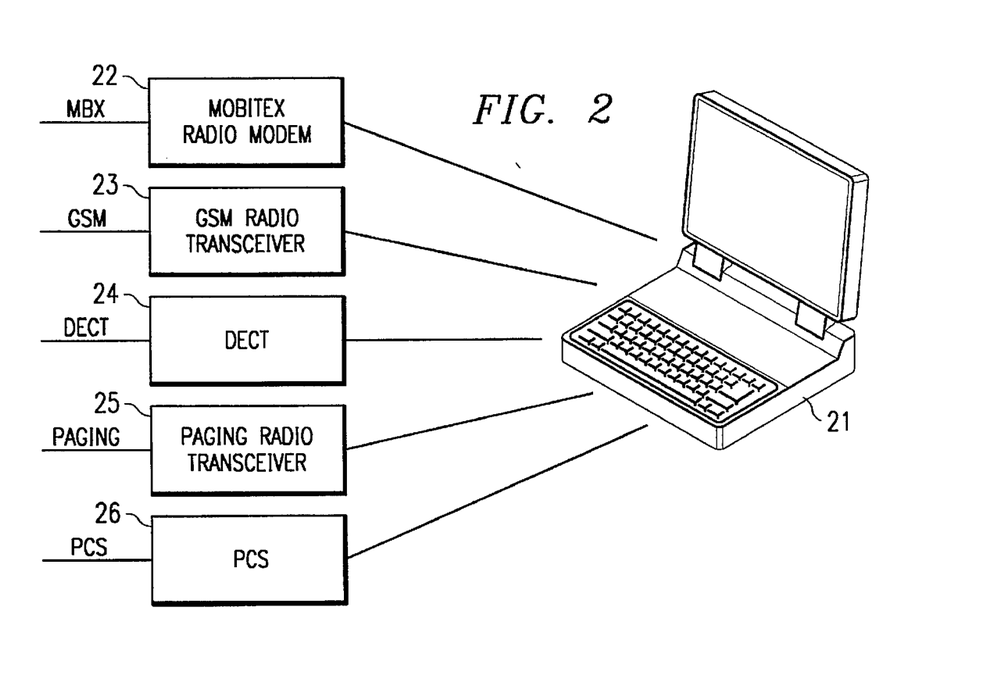
FIG. 2 is a block diagram illustrating the use of modular radio equipment within a PC.

Referring next to FIG. 2, there is shown a computer 21 which may comprise either a laptop, notebook, pen based, or conventional desktop PC. Also represented are several standard modems 22–26. The modems 22–26 are adapted for enabling the PC 21 to communicate on any one of a plurality of different telecommunications networks, each operating in accordance with different standards and protocols. Modem 22 thus allows communication of the PC 21 on the MOBITEX package switched data network. Modem 23 allows communication on the GSM European digital cellular radio network, while modem 24 allows communication on the DECT network. Modem 25 permits communication on a paging network such as a local or a global paging system, while modem 26 enables communication on a PCS (Personal Communication System). The PCS may become the next generation of cellular systems combining wide area networks and on-site networks for both data and voice communication. The system of the present invention thus allows such modems 22–26 to be constructed in accordance with a standard modular format that contains consistent and fixed form factors having standard electrical pinouts and common interfaces to the PC 21, or the like, enabling a simple plug interconnection therewith. This is a marked advance over the prior art.

Figure 3:
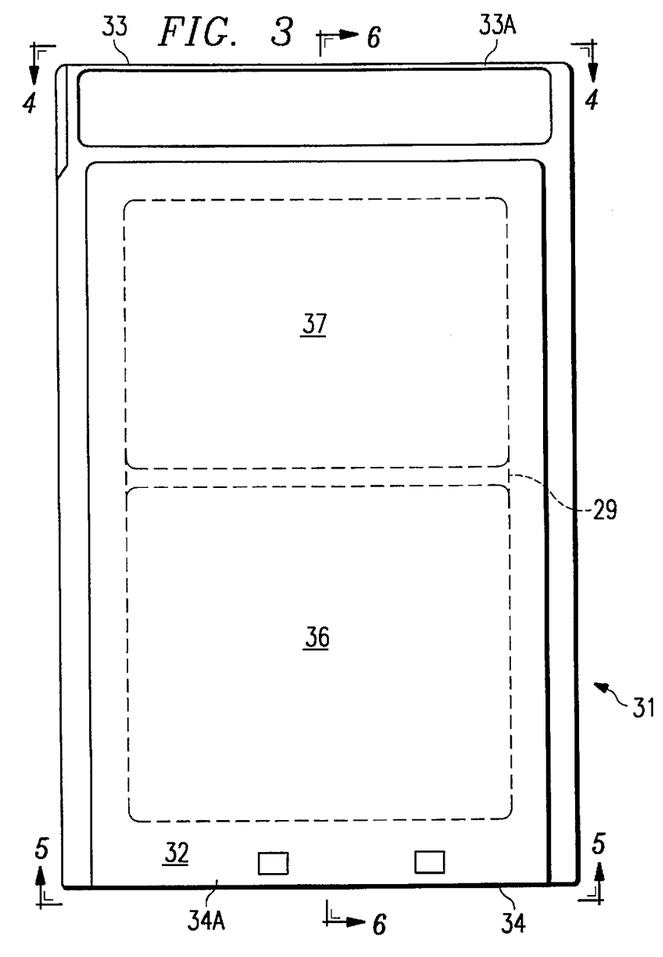
FIG. 3 is a top plan view of one embodiment of a modular telecommunications unit constructed in accordance with the principles of the present invention.

Referring now to the grouping of FIGS. 3–6 and 7–9A, there are shown two versions of a telecommunications unit constructed in accordance with the principles of the present invention. FIGS. 7–9A (group one) illustrate a telecommunications unit 131 which is constructed to conform with a standard PCMCIA card interconnectivity format embodied in connector 133. FIGS. 3–6 (group two) illustrate a unit 31 which is constructed with a modified connector 33 which does not comply with existing PCMCIA standards due to modifications in antenna and power connections discussed below. Each version of the above-referenced telecommunications unit will now be discussed. Referring first to the group two version of the telecommunication unit outlined above, there is shown in FIG. 3 a top plan view of a modular telecommunications unit 31 constructed to conform with a modified PCMCIA card interconnectivity format. In particular, the modular unit 31 includes an outer shell 32 which is generally flat and has located at a first end 33A a multipin connector 33 (seen most clearly in FIG. 4) having a plurality of individual contacts for engagement with a mating connector located within an item of an electronic equipment, such as a PC. It should be noted that although a PC is referred to, a variety of electronic equipment could be addressed and modified in accordance with the principles of the present invention to provide modular telecommunications therefrom. In that regard, the opposite end 34A of the modular unit 31 includes a recessed region 34 where external power and antenna connectors may be mounted, as described below with regard to FIG. 7.

Still referring to FIG. 3 the modular unit 31 houses a telecommunications card 29 including a radio transceiver 36, which may include a modem section 37. The card 29 is shown by dotted lines as are transceiver and modem sections 36 and 37. Data from electronic equipment, such as a PC, are coupled into the card 29 through selected contacts from the multipin connector 33, as described in more detail below.

Figure 4:
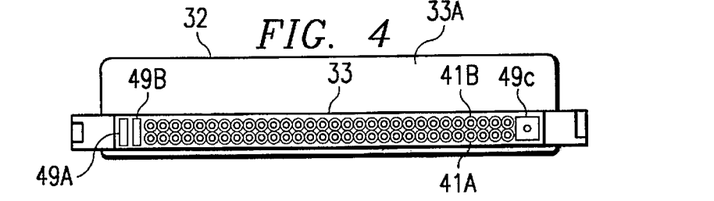
FIG. 4 is a front elevational view of the modular unit shown in FIG. 3 illustrating the pin connections thereto.

Referring now to FIG. 4, there is shown a front elevational view of the modular unit 31 of FIG. 3, illustrating more clearly the multipin connector 33. The contacts of multipin connector 33 are connected to circuitry within the telecommunications card 29. The connector 33 comprises a pair of rows of contacts 41A and 41B constructed in accordance with a modification to the standard PCMCIA format. In the system of the present invention, certain areas of the contact array have been modified and the contacts provided in a different configuration and/or format to allow connection to an antenna and/or power source for transmission of increased amounts of power into the circuitry of the card 29. Such connection may be necessary when the power requirements of the transceiver 36 (and/or modem 37) cannot be adequately handled by the normal signal carrying contacts 41A–41B. Contacts 49A and 49B are thus shown to illustrate such a modified power pin configuration. Connector 49C illustrates an antenna coupling. It should be noted that other antenna and power connections may be provided in accordance with the principles of the present invention and another specific embodiment is described below.

Figure 5:
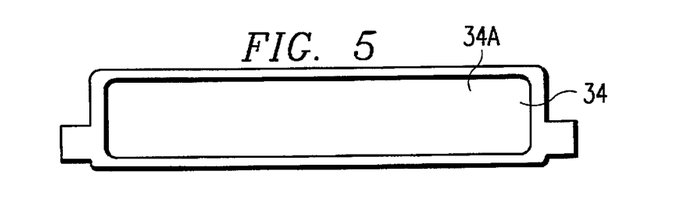
FIG. 5 is a rear elevational view of the modular unit of FIG. 3 illustrating one embodiment thereof with no antenna or power connector thereon.

Referring now to FIG. 5, the end 34A is formed with a recess 34 wherein other connectors may be mounted for use in coupling the radio transceiver 36 and modem 37 within the module 31 to an external antenna. However, with the antenna connector 49C and power contacts 49A and 49B provided along connector 33, such external connectors are not necessary along the opposite end in recess 34. For this reason, no connectors are shown in this particular embodiment.

Figure 6:
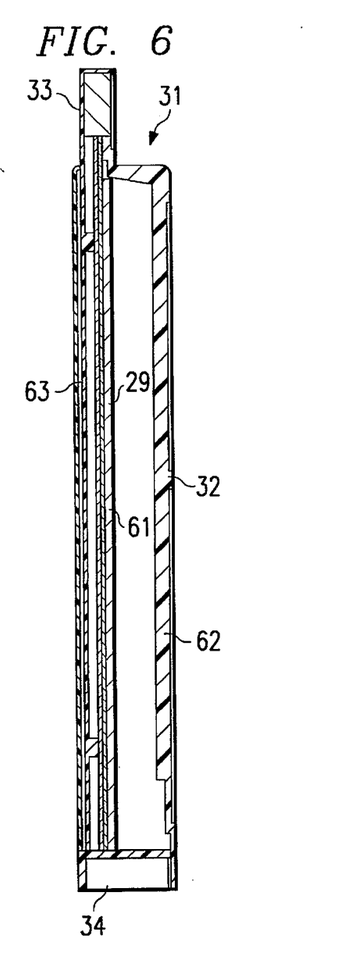
FIG. 6 is a side elevational, cross-sectional view of the modular unit of FIG. 3 taken along the lines 6—6 thereof.

Referring now to FIG. 6, there is shown a side elevational, cross sectional view of the modular unit 31. As most clearly shown in this view, the telecommunications card 29 of module 31 includes a printed circuit board 61 onto the surface of which various printed circuit card traces may be formed and various components, for example, ASICs (Application Specific Integrated Circuits), may be mounted to comprise the radio transceiver and modem secured within the module 31. The circuitry on the board 61 is selectively connected to the contacts 41A–41B on the connector 33 to couple signals into and out of the circuitry within said module. An upper shell 62 covers the upper portion of the components mounted on the board 61 while a lower shell 63 covers the lower surface of the board and mates with the upper shell 62 to form an enclosed modular unit.

Figure 7:
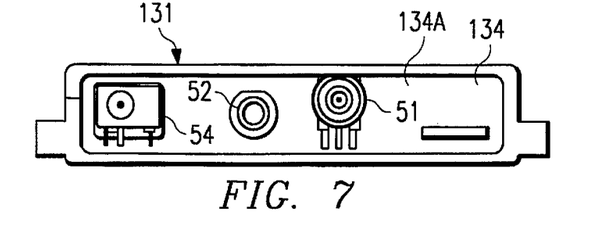
FIG. 7 is a rear elevational view of another embodiment of a modular telecommunications unit constructed in accordance with the principles of the present invention and having a standard PCMCIA card interconnectivity format.
Figure 10:
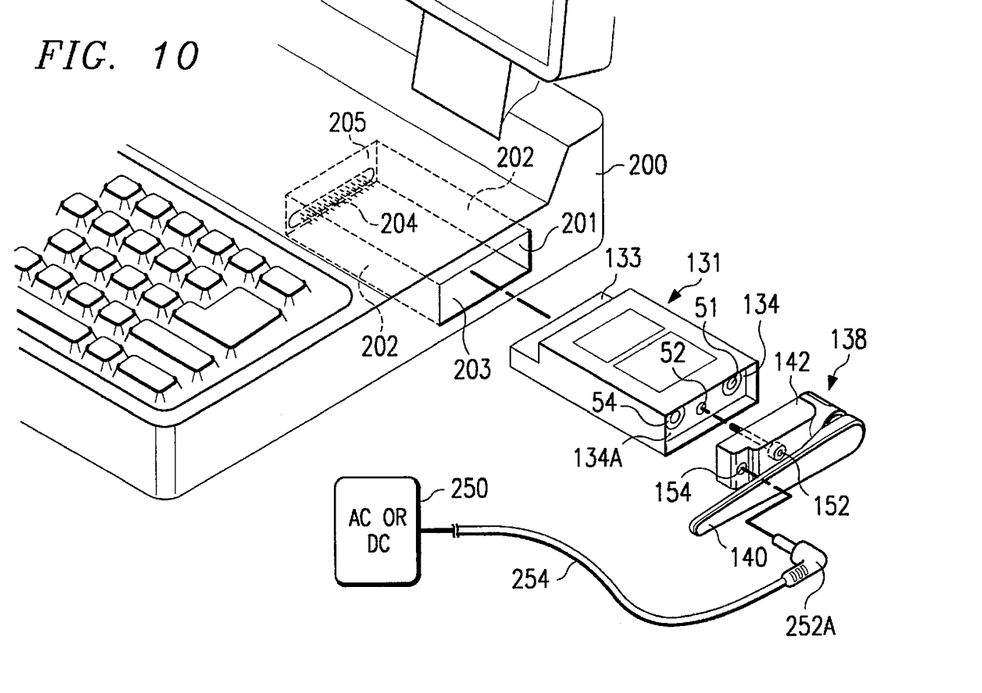
FIG. 10 is an exploded, perspective view of a modular unit of the type shown in FIG. 8 in association with a module receiving slot in a PC.
Figure 11:
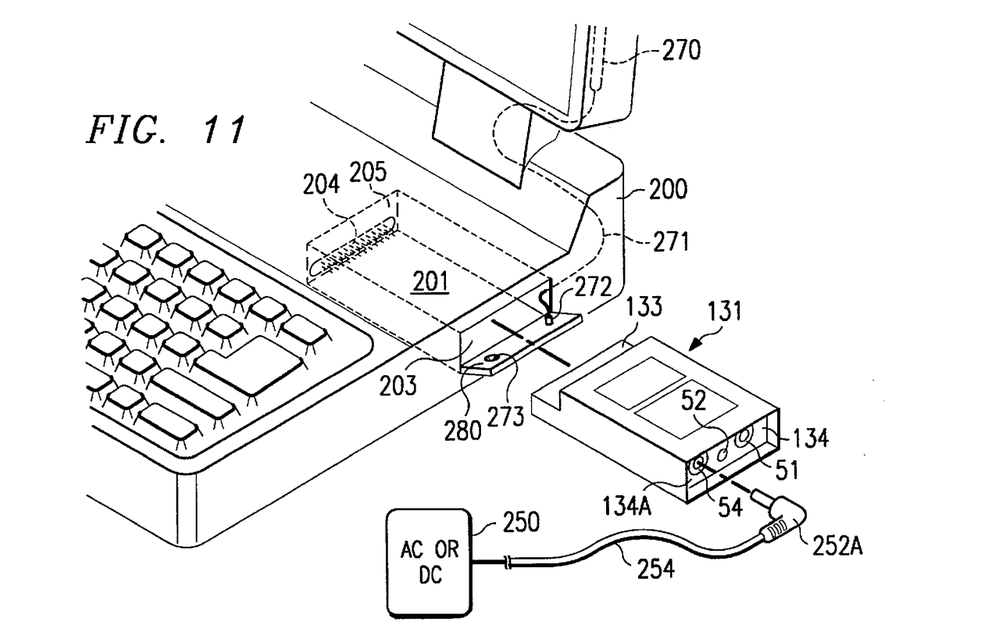
FIG. 11 is an exploded, perspective view of an alternative embodiment of the modular unit of FIG. 10 and its mounting in a PC.

Referring now to the group one version of the telecommunications unit outlined above, there is shown in FIG. 7 a rear elevational view of another embodiment of a modular telecommunications unit constructed in accordance with the principles of the present invention. In this embodiment, the standard PCMCIA card interconnectivity format is utilized. Modular unit 131 of FIG. 7 includes a recessed rear portion or end 134A having a recess 134 wherein coaxial connector 51 is secured adjacent a mounting member 52 such as a threaded coupling. The coaxial connector 51 is mounted for use in coupling the radio transceiver 36 within the module 131 to an antenna disposed either internally or externally of the particular electronic equipment in which the unit 131 is connected. For example, an external antenna is shown in FIG. 10, while an internally mounted antenna is shown in FIG. 11. The internal antenna shown in FIG. 11 is but one example of an antenna which may, for example, be mounted inside a laptop computer that has been specifically modified for use with the telecommunications system of the present invention. When an antenna is mounted directly to the module 131, mounting member 52 provides a means for securement of the antenna structure to module 131, as will be described in more detail below. A connector 54 is also shown in FIG. 7. Connector 54 enables coupling of external power to the telecommunications card 29 within the module 131.

Figure 8:
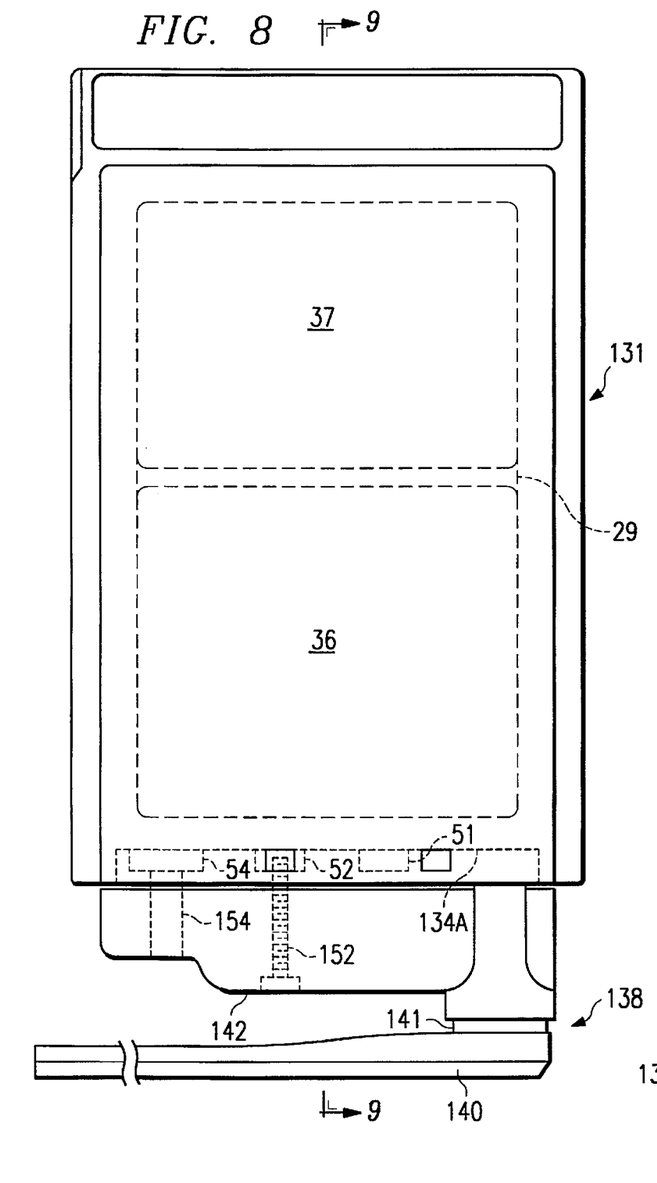
FIG. 8 is a top plan view of the modular unit of FIG. 7 illustrating an external antenna mounted thereon.

Referring now to FIG. 8 there is shown a top plan view of the modular unit 131 of FIG. 7 illustrating in more detail the external antenna mounting structure 138 which may be attached to end 134A thereof. As described above, radio transceiver 36 and modem 37 are shown by dotted lines which also define the telecommunications card 29. The mounting member 52 and connectors 51 and 54 of FIG. 7 are also represented in FIG. 8 by dotted lines. Connector 51 comprises a coaxial antenna coupling which is plugged into the antenna 138 of FIG. 8. The particular modular antenna structure 138 of FIG. 8 includes an antenna bar 140, which is pivotally mounted through pivot antenna mount 141 to rotate about a base structure 142. Base 142 is coupled to the module 131 with a conventional fastener, such as a threaded member 152 shown in dotted lines engaging mounting member 52. Antenna connector 51 is also shown by dotted lines to illustrate a conventional coaxial connection thereto from antenna 138. The antenna 138 may then be rotated into the most appropriate position for maximizing effectiveness of use. Rotatable antennas are, of course, conventional in this technological area. The use, however, of such a modular antenna on a modular housing unit 131, adapted for the applications described herein, is a marked advance over the prior art. Power connector 54 is also shown by dotted lines in registry with access aperture 154, which will be discussed below.

Figure 9:
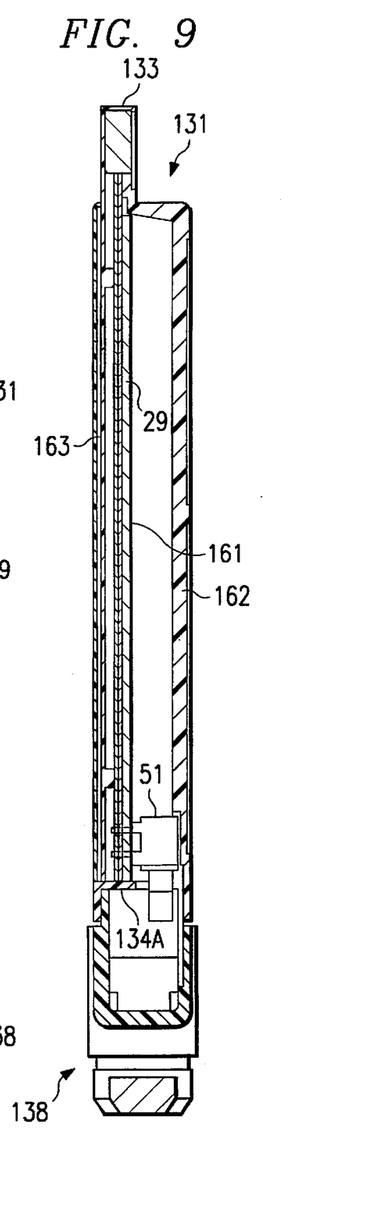
FIG. 9 is a side elevational, cross-sectional view of the modular unit of FIG. 8 illustrating the attachment of the antenna thereto.

Referring now to FIG. 9 there is shown a side elevational, cross-sectional view of the modular unit 131 of FIG. 8 taken along lines 9—9 thereof. As shown in FIG. 9, the module 131 includes a telecommunications card 29 comprising a printed circuit board 161 onto the surface of which various printed circuit card traces may be formed and various components may be mounted to comprise a radio transceiver and modem secured within the module 131. The circuitry on board 161 is selectively connected to the terminals of connector 133 to couple signals into and out of the circuitry within the module 131. An upper shell 162 covers the upper portion of the components mounted on the printed circuit board 161 while a lower shell 163 covers the lower surface of the board and mates with upper shell 162 to form an enclosed unit similar to that shown in FIG. 6 for modular unit 31. In this particular view an internal portion of coaxial connector 51 is shown mounted to board 161 and projecting through rear portion 134A to connect with modular antenna 138. The construction of modular antenna 138 is as described above in connection with FIG. 8.

Figure 9A:
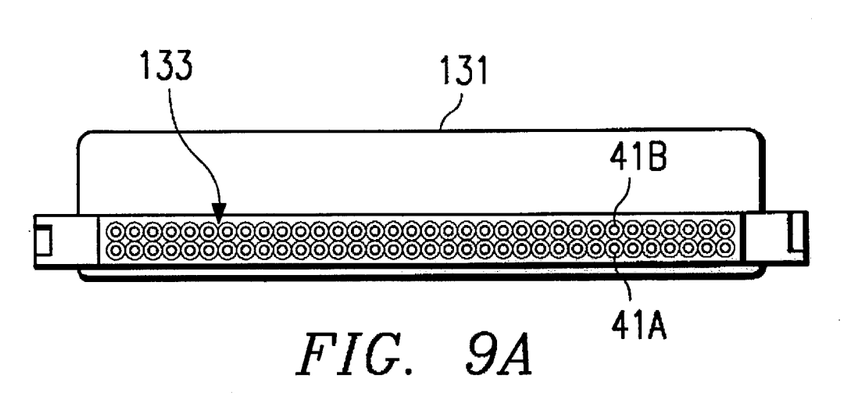
FIG. 9A is a front elevational view of the modular unit of FIG. 7 illustrating a standard PCMCIA card interconnectivity format.

Referring now to FIG. 9A there is shown a front elevational view of the modular unit 131 of FIG. 7, illustrating more clearly the multipin connector 133. The multipin connector 133 is constructed in accordance with the current standard PCMCIA card interconnectivity format. The contacts of multipin connector 133 are connected to the circuitry within the telecommunications card 29. The connector 133 comprises a pair of rows of contacts 41A and 41B. No separate power or antenna connectors are shown herein due to the fact that this particular contact configuration conforms with the existing PCMCIA standard and the antenna and power connectors are presented in the rear portion 134A of module 131 as described above.

Referring now to FIG. 10 there is shown an installation of the modular unit 131 into a PC 200 which has been modified in design to include a mounting slot 201. The mounting slot 201 is particularly adapted for receipt of and connection to module 131. The slot 201 is constructed with side walls 202 and a frontal opening 203. A mating connector 204 is disposed along end 205 for mating connection with connector 133. The modular antenna structure 138 (described above) is also shown in position for mounting to the end 134A of module unit 131. Connecting end 134A thus includes recess 134 which houses connectors 51 and 54. Connector 51 is preferably a coaxial connector adapted for coupling to antenna 138, while connector 54 is constructed for connecting external power to the modular unit 131 through aperture 154 found in antenna base structure 142. In that regard, an AC/DC power supply 250 is shown in position for connection to connector 54 by a connecting plug 252A which is connected to the power supply 250 by a cable 254. In this manner, external power may be provided to the module 131 from an external source.

Referring now to FIG. 11 there is shown an alternative mounting of the modular unit 131 of FIG. 10 and an alternative modification to the PC 200. In this particular view, the modular unit 131 is being installed in PC 200 constructed with a flap 280. The flap 280 is provided in a configuration for closure over the module unit 131 and direct coupling with coaxial connector 51, while continuing to expose external power connector 54. In this embodiment, an internal antenna 270 is installed within the PC 200 and connected by a wire 271 (shown in phantom) to flap connector pin 272 of flap 280. Aperture 273 is positioned in flap 280 for alignment with power connector 54 of module 131 and sized to facilitate receipt of, and connection from, plug 252A into connector 54. As described above, connector 133 of module 131 is shown to matingly connect with slot connector 204 disposed on end 205 of slot 201. In an alternative embodiment, not specifically shown, an internal power supply from the PC 200 may be connected to the connector 54 of module 131 by coupling to a power connection pin disposed on the flap 280 in place of the aperture 273. The illustration thereof, if shown, would be similar to the illustration of the power supply 290 of FIG. 12 (discussed below) but with a line 291 extending to the flap 280.

Figure 12:
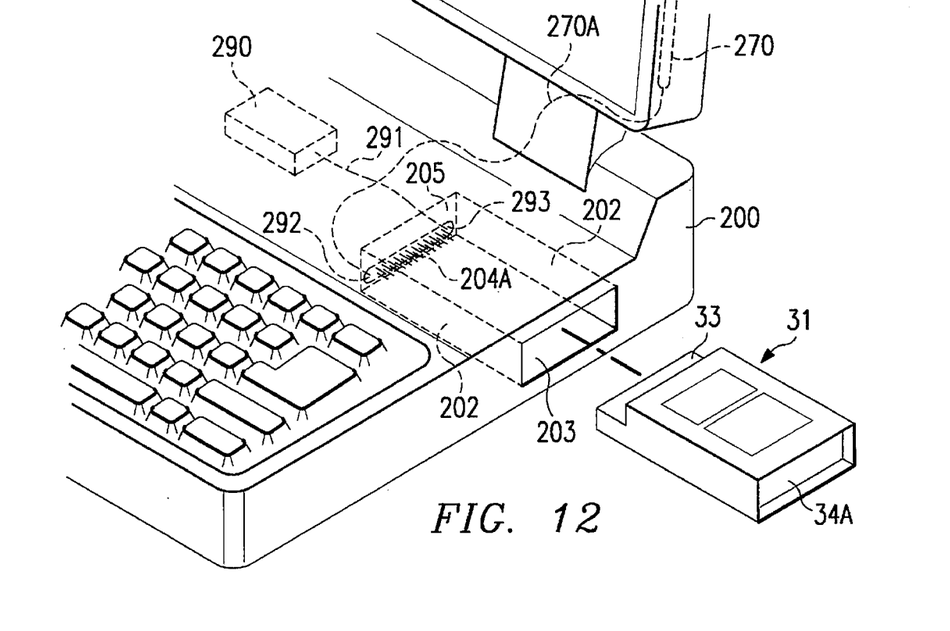
FIG. 12 is an exploded, perspective view of the modular unit of FIG. 3 being inserted in a PC having a built-in antenna and power supply therefor.

Referring now to FIG. 12 there is shown the installation of the modular unit 31 of FIG. 3 into a PC 200. In this embodiment, the external connectors 51 and 54 described above are not utilized and are thus not present on end 34A. The absence of the external connectors is due to the connection through connector 33 of antenna 270 and separate power supply 290 from within the PC 200. As stated above, this is a modification to the standard PCMCIA and interconnectivity format. The PC 200 has thus been modified in design to specifically accommodate the module 31 and the advantages thereof. Power supply line 291 is thus shown by a dotted line to connect pin 292 of specially adapted connector 204A positioned in registry with, and mating engagement of, the appropriate power connecting contacts 49A or 49B (shown in FIG. 4). Connector 204A is a modified form of the connector 204 of FIG. 10 due to the fact that it must provide connection to the antenna and power contacts herein referenced. Likewise antenna cable 270A is shown by a dotted line to connect pin 293 of connector 204 positioned in registry with, and mating engagement of, antenna connector 49C (shown in FIG. 4). It may be seen in this particular embodiment that the advantages of both the communications antenna and the additional power supply are provided without the need for external connections from end 34A. The module 31 can simply be plugged into slot opening 203, whereby connector 33 mates with connector 204A, and the telecommunication system becomes operational.

Figure 13:
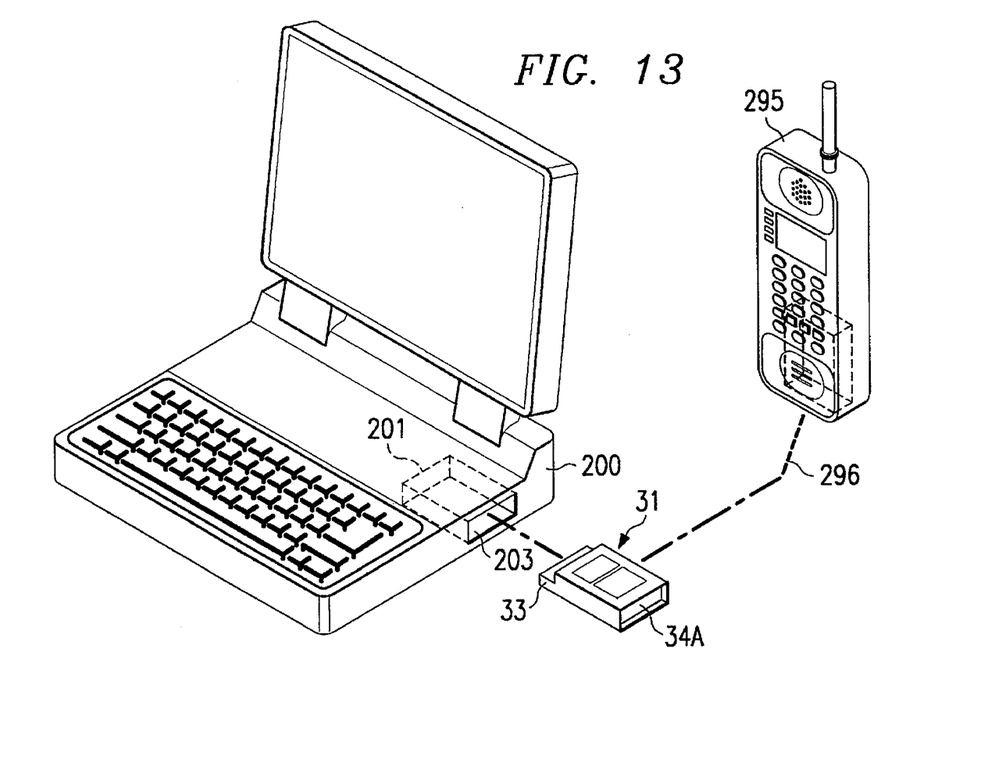
FIG. 13 is an exploded, perspective view of a modular unit constructed in accordance with the principles of the present invention and illustrating its adaptability for use in a combination of electronic equipment.

Referring now to FIG. 13 there is shown a diagrammatical illustration of yet another aspect of the present invention. The combination of use of the modular unit 31 of FIG. 12 is illustrated wherein its placement within a PC 200 is only one of at least two possible functions. It should be noted that either module 31 or 131 could be used in such a combination. Reference to module 31 is for purposes of illustration. The modular units 31 and 131 may likewise be placed within a cellular unit 295 as represented by line 296 extending there between. The modular units 31 and 131 are thus capable of multiple use with multiple items of electronic equipment. It should be noted that the absence of connectors on end 34A of the modular unit illustrated indicates that antenna and power connections are made through connector 33 and that the particular electronic equipment that is adapted for use therewith provides such an antenna and power supply. However, as stated above, module 131 could also be used in such applications.

Figure 14:
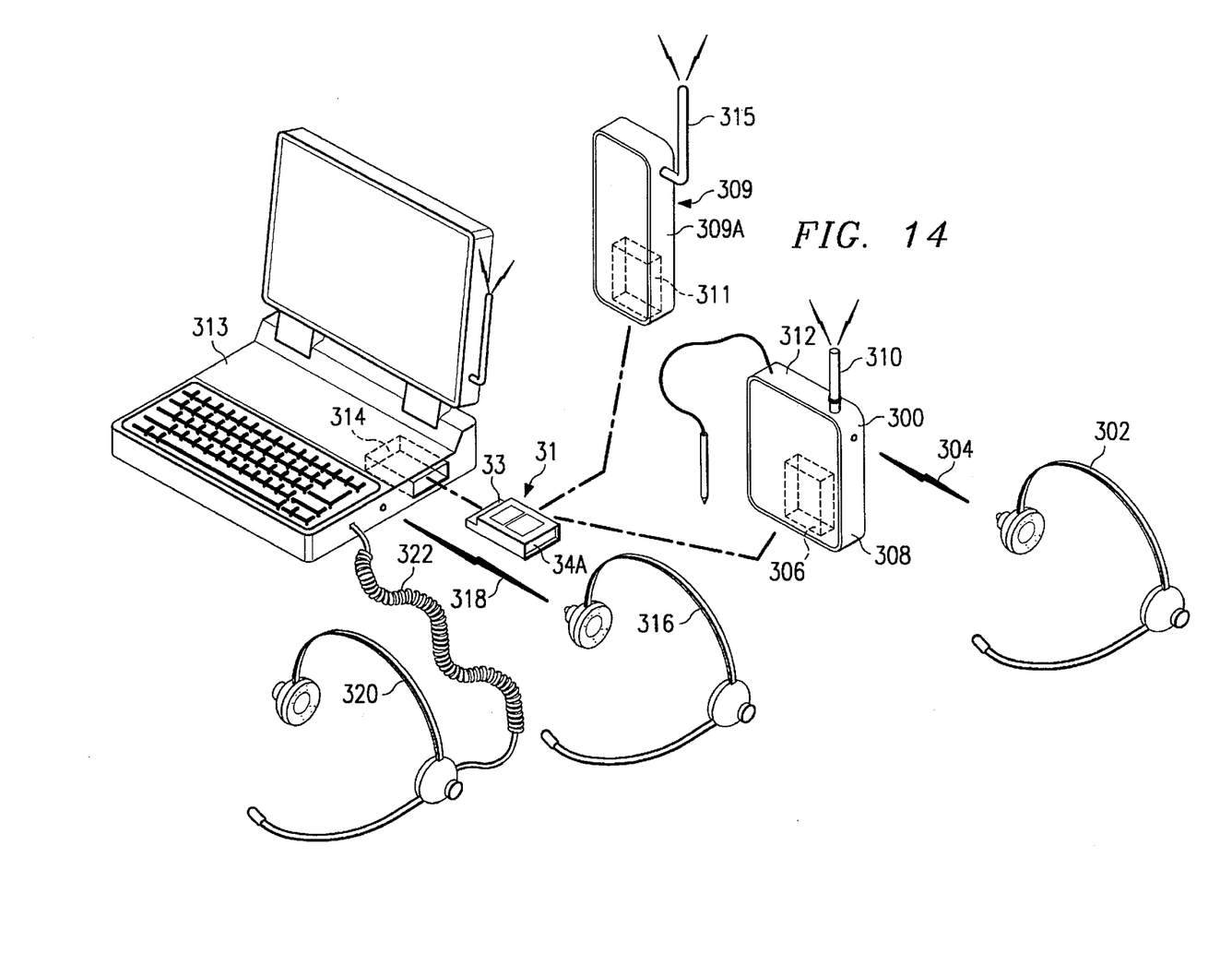
FIG. 14 is an exploded perspective view of a modular unit constructed in accordance with the principles of the present invention and illustrating multiple applications thereof.

Referring now to FIG. 14 there is shown a diagrammatical illustration of the versatility and multiple uses possible with the modular units 31 and 131 of the present invention. As stated above, either module 31 or 131 may be used in such applications, although only module 31 is represented in this particular drawing. As represented herein, there are at least two wireless functions provided by the modular units 31 and 131. Several technologies may, in fact, reside on a single card within the modular units 31 and 131. For example, Mobitex and AMPS communication formats may be utilized. With the module 31 herein shown plugged into a notebook 300, data communication over Mobitex may be therein provided. Telephone calls may likewise be completed through the AMPS system or other format, wherein a head set 302 is shown linked to the notebook 300. An infrared link 304 is illustrated, although other connections would be possible. Likewise, module mounting slot 306 is shown within housing 308 of notebook 300. A communication antenna 310 is shown on the top 312 of the notebook 300. The notebook 300 may be of a conventional design which has been modified for the slot 306 and the other connection and system aspects described above. More specifically, the slot 306 is constructed for the receipt of, and mating engagement with, connector 33 of the module 31. It may be seen that the module 31 in this particular embodiment is constructed for both power and antenna couplings from the area around connector 33, as described in FIG. 4 above. For this reason, no external connectors are shown on end 34A. For purposes of simplicity, the appropriate connectors inside the notebook and other electronic equipment shown in this particular illustration are not illustrated.

Still referring to FIG. 14, a second utilization of the module 31 may be within a cellular telephone 309. The phone 309 incorporates a chassis 309A of conventional design, or which incorporates a special display (not shown). The module 31 is inserted into slot 311 and connected with a software generated display that corresponds to technology and the standards that are activated. In that regard a touch screen may then display the available phone features that can then be dialed. Antenna 315 is shown to upstand from chassis 309A in accordance with the aspects of the invention discussed above.

Still referring to FIG. 14 there is shown a pen based computer 313 or similar structure which serves to provide pen input while generating a display similar to a cellular phone when activated. Due to the fact that the system for a cellular phone is already in the computer by virtue of the module 31 secured within slot 314, the user can use the option of telephonic communication by simply connecting a headset 316 through an infra red connection 318 or a headset 320 connected by a conventional cable 322. The computer can then be simultaneously used for data communication, faxes, and other forms of informational exchanges which are deemed necessary.

As described above it may be seen that the modular units 31 and 131 have multiple uses. From a design perspective, they may be relatively thick, on the order of 10.5 mm and the particular electronic equipment will have to be appropriately modified in design for receipt thereof. The connector 33 of the modular unit 31 may include a standard PCMCIA 3.0 mm card interconnection. Moreover, as described above the card edge connector 33 may include special contacts 49A and 49B for higher power connection and consumption in certain situations.

It may further be seen from the figures above that antenna connections, as well as special power connections, enable the implementation of a modular unit with a minimum of special adaptations required for individual installations. (See particularly FIG. 14.) In this way, the system of the present invention enables the construction of modular radio communications units for flexible adaptation to different standards and different circumstances but which can be incorporated into standard card slots in a variety of electronic equipment.

While it is believed that the operation and construction of the system of the present invention will be apparent from the foregoing description, the method of operation and structure of the system shown and described has been characterized as being preferred and obvious changes and modifications may be made therein without departing from the spirit and scope of the invention as defined in the following claims.

What is claimed is:
1. A system comprising:
 an electronic equipment having a module mating connector;
 a modular telecommunications unit comprising:
  a housing having a first end and a second end;
  a module coupling connector disposed on the first end of said housing, said module coupling connector being adapted for engagement with the module coupling connector being of said electronic equipment;
  an antenna coupling connector disposed on the second end of said housing; and
  a radio transceiver being mounted within said housing and being in communication with said module coupling connector and said antenna coupling connector;

wherein said electronic equipment further includes an antenna and an antenna mating connector, said antenna mating connector being in communication with said antenna and adapted for engagement with said antenna coupling connector for enabling communication between said antenna and said radio transceiver;

wherein said electronic equipment is constructed with a slotted portion having a first slot end and a second end, said module mating connector being disposed on the first slot end of said slotted portion, and said slotted portion being adapted for receipt of said housing therein; and wherein said slotted portion of said electronic equipment includes a closure member disposed adjacent to said second end of said slotted portion for securing said housing of said modular telecommunications unit within the slotted portion of said electronic equipment, wherein said antenna mating connector is disposed on said closure member, and wherein said antenna of said electronic equipment is connected to said antenna coupling connector through said antenna mating connector on said closure member.

2. A method of providing telecommunications from an item of electronic equipment comprising the steps of:

providing a modular telecommunications unit having a transceiver housed therein;

disposing a PCMCIA coupling connector on said modular telecommunications unit with said transceiver coupled thereto;

programming said transceiver for telecommunications in accordance with more than one preselected bi-directional wireless telecommunication standard;

providing a mounting structure for said modular telecommunications unit in association with said electronic equipment;

disposing a mating PCMCIA connector within said mounting structure for the engagement of said coupling connector;

providing an antenna for connection to said modular telecommunication unit; and wherein said step of providing the mounting structure includes the step of forming a slot having a first end and a second end within said electronic equipment, disposing said mating PCMCIA connector adjacent to the first end of said slot for the engagement of said coupling connector, and providing a closure member adjacent to the second end of said slot for securing said modular telecommunications unit within said slot.

3. The method of providing telecommunications as set forth in claim 2 and further including the steps of:

providing an equipment antenna connector being in communication with said antenna;

providing a module antenna connector being in communication with said transceiver of said modular telecommunications unit; and positioning said equipment antenna connector on said closure member and said module antenna connector on said modular telecommunications unit, such that said equipment antenna connector connects with said module antenna connector when said closure member secures said modular telecommunications unit within said slot of said mounting structure.

4. The method of providing telecommunications as set forth in claim 3 and further including the steps of:

disposing said modular telecommunications unit within said slot of said mounting structure such that said PCMCIA coupling connector connects with said mating PCMCIA connector; and closing said closure member such that said closure member secures said modular telecommunications unit within said slot of said mounting structure and said equipment antenna connector connects with said module antenna connector.

5. The method of providing telecommunications as set forth in claim 2 and further including the step of disposing said modular telecommunications unit within said slot of said mounting structure such that said PCMCIA coupling connector connects with said mating PCMCIA connector.

* * * * *

UNITED STATES PATENT AND TRADEMARK OFFICE
CERTIFICATE OF CORRECTION

PATENT NO. :   5,628,055
DATED      :   May 6, 1997
INVENTOR(S) :  Stein

It is certified that error appears in the above-identified patent and that said Letters Patent is hereby corrected as shown below:

Title Page, Item [54],
  Title              Replace "MODULAR RADIO COMMUNICATIONS
    and              SYSTEM"
                     With --MODULAR/PRINTED CIRCUIT CARD
Column 1, lines 1-2  FOR WIRELESS TELECOMMUNICATIONS--

Column 8, line 26    Delete "unit"

Column 8, line 42    Delete "unit"

Column 10, lines 60-61   Replace "coupling connector being"
                         With --mating connector--

Signed and Sealed this

Sixth Day of January, 1998

Attest:

BRUCE LEHMAN

*Attesting Officer*        *Commissioner of Patents and Trademarks*